United States Patent
Obaidi (10) Patent No.: US 10,972,901 B2
(45) Date of Patent: Apr. 6, 2021

(54) REMOTE SIM UNLOCK (RSU) IMPLEMENTATION USING BLOCKCHAIN

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/262,559

(22) Filed: Jan. 30, 2019

(65) Prior Publication Data

US 2020/0245128 A1    Jul. 30, 2020

(51) Int. Cl.
  *H04W 8/18*    (2009.01)
  *H04W 60/00*   (2009.01)
  *H04B 1/3816*  (2015.01)
  *H04M 1/725*   (2021.01)

(52) U.S. Cl.
  CPC .......... *H04W 8/183* (2013.01); *H04B 1/3816* (2013.01); *H04M 1/72577* (2013.01); *H04W 60/00* (2013.01)

(58) Field of Classification Search
  CPC .... H04W 8/183; H04W 60/00; H04B 1/3816; H04M 1/72577
  See application file for complete search history.

(56) References Cited

U.S. PATENT DOCUMENTS

| | | | |
|---|---|---|---|
| 6,226,749 B1 | 5/2001 | Carloganu et al. | |
| 6,317,836 B1 | 11/2001 | Goren et al. | |
| 6,321,079 B1 | 11/2001 | Cooper | |
| 6,327,660 B1 | 12/2001 | Patel | |
| 7,689,204 B2 | 3/2010 | Dupuis et al. | |
| 8,369,823 B2 | 2/2013 | Chen | |
| 8,737,318 B2 | 5/2014 | Fan et al. | |
| 9,055,443 B2 | 6/2015 | Froelich et al. | |

(Continued)

FOREIGN PATENT DOCUMENTS

| | | |
|---|---|---|
| CN | 1331371 | 8/2007 |
| CN | 101398872 | 4/2009 |

(Continued)

OTHER PUBLICATIONS

Final Office Action for U.S. Appl. No. 15/669,350, dated Mar. 8, 2019, Magadevan, "Secure Updating F Telecommunication Terminal Configuration", 17 pages.

(Continued)

*Primary Examiner* — Anthony S Addy
*Assistant Examiner* — Farid Seyedvosoghi
(74) *Attorney, Agent, or Firm* — Lee & Hayes, P.C.

(57) ABSTRACT

A permissioned blockchain can be a decentralized data store that maintains information indicating whether user equipment (UE) is SIM locked and/or should be disabled. A UE can access the blockchain during boot up to determine if it should be disabled and not booted into a normal operating environment, and/or whether it is SIM locked to a particular carrier. Authorized entities, such as carriers and UE manufacturers, can update the blockchain to indicate that certain UEs should be disabled, are SIM locked, are not SIM locked, and/or whether it is permissible to remove SIM locks from those UEs.

17 Claims, 7 Drawing Sheets

(56) References Cited

U.S. PATENT DOCUMENTS

| | | | |
|---|---|---|---|
| 9,172,538 | B2 | 10/2015 | Obaidi |
| 9,319,884 | B2 | 4/2016 | Buzescu et al. |
| 9,456,349 | B2 | 9/2016 | Kim et al. |
| 9,591,484 | B2 | 3/2017 | Ionescu et al. |
| 10,123,202 | B1* | 11/2018 | Polehn ............ H04W 12/00401 |
| 10,299,128 | B1* | 5/2019 | Suthar ...................... H04L 9/30 |
| 2004/0203605 | A1* | 10/2004 | Safa ................... H04W 12/0802 455/411 |
| 2005/0172135 | A1 | 8/2005 | Wiersma |
| 2006/0075259 | A1 | 4/2006 | Bajikar et al. |
| 2007/0072620 | A1 | 3/2007 | Levitan |
| 2007/0154014 | A1 | 7/2007 | Aissi et al. |
| 2007/0180269 | A1 | 8/2007 | Irish et al. |
| 2007/0264990 | A1 | 11/2007 | Droste et al. |
| 2008/0090614 | A1 | 4/2008 | Sicher et al. |
| 2008/0125084 | A1 | 5/2008 | Cambois et al. |
| 2008/0132226 | A1 | 6/2008 | Carnall |
| 2008/0209206 | A1 | 8/2008 | Vaha-Sipila et al. |
| 2008/0229092 | A1 | 9/2008 | Dale et al. |
| 2008/0282084 | A1 | 11/2008 | Hatakeyama |
| 2008/0307494 | A1 | 12/2008 | Holtzman et al. |
| 2009/0083858 | A1 | 3/2009 | Jennings et al. |
| 2009/0158419 | A1 | 6/2009 | Boyce |
| 2009/0165119 | A1 | 6/2009 | Ramanath |
| 2009/0270126 | A1 | 10/2009 | Liu |
| 2009/0325646 | A1 | 12/2009 | Stewart et al. |
| 2010/0082968 | A1* | 4/2010 | Beverly .............. G06F 12/1433 713/2 |
| 2010/0263043 | A1 | 10/2010 | Xu |
| 2010/0273452 | A1 | 10/2010 | Rajann et al. |
| 2010/0299744 | A1 | 11/2010 | Mardiks |
| 2011/0076986 | A1 | 3/2011 | Glendinning et al. |
| 2011/0081889 | A1 | 4/2011 | Gao et al. |
| 2011/0130117 | A1* | 6/2011 | Fan ................... H04M 15/8038 455/411 |
| 2011/0130118 | A1 | 6/2011 | Fan et al. |
| 2011/0159843 | A1 | 6/2011 | Heath et al. |
| 2011/0212706 | A1 | 9/2011 | Uusilehto |
| 2011/0307711 | A1 | 12/2011 | Novak et al. |
| 2012/0042376 | A1 | 2/2012 | Dolgunov et al. |
| 2012/0042396 | A1 | 2/2012 | Guerra et al. |
| 2012/0058743 | A1 | 3/2012 | Chen |
| 2012/0083242 | A1 | 4/2012 | Spitz et al. |
| 2012/0101941 | A1 | 4/2012 | Kang et al. |
| 2012/0157055 | A1* | 6/2012 | Ren ..................... H04L 63/0853 455/411 |
| 2013/0078951 | A1 | 3/2013 | Mun et al. |
| 2013/0304616 | A1 | 11/2013 | Raleigh et al. |
| 2013/0305047 | A1 | 11/2013 | Xi et al. |
| 2013/0326643 | A1 | 12/2013 | Pai et al. |
| 2014/0057597 | A1 | 2/2014 | Velusamy et al. |
| 2015/0007275 | A1 | 1/2015 | Hilbert et al. |
| 2016/0019735 | A1 | 1/2016 | Myers et al. |
| 2016/0029220 | A1 | 1/2016 | Obaidi |
| 2016/0037344 | A1* | 2/2016 | Kim ....................... H04L 67/14 455/411 |
| 2016/0100309 | A1 | 4/2016 | Velusamy |
| 2018/0167198 | A1* | 6/2018 | Muller .................... G06F 21/44 |
| 2018/0309754 | A1 | 10/2018 | Magadevan et al. |
| 2018/0309868 | A1 | 10/2018 | Karimli et al. |
| 2019/0007840 | A1 | 1/2019 | Velusamy et al. |
| 2020/0021585 | A1 | 1/2020 | Magadevan et al. |

FOREIGN PATENT DOCUMENTS

| | | |
|---|---|---|
| EP | 1359733 A1 | 11/2003 |
| EP | 2063378 | 5/2009 |
| WO | WO2004063871 A2 | 7/2004 |
| WO | WO2008077628 A2 | 7/2008 |
| WO | WO2013158977 A1 | 10/2013 |

OTHER PUBLICATIONS

Lee, et al., "A New Delegation-Based Authentication Protocol for Use in Portable Communication Systems", IEEE Transactions on Wireless Communications, vol. 4, No. 1, Jan. 2005, pp. 57-64.

Barriga, L., et al., "M2M Remote-Subscription Management", Ericsson Review, 2011, 6 pages.

Cartes 2012 Demo Presentation, Giesecke and Devrient, retrieved Jun. 16, 2016 from <<https://www.gi-de.com/gd_media/media/documents/complementary_material/events_1/04_STE_CARTES__Demo_Presentation.pdf>>, 9 pages.

The Chinese Office Action dated Feb. 26, 2016 for Chinese patent application No. 201280053062.8, a counterpart foreign application of U.S. Pat. No. 9,055,443.

The Chinese Office Action dated Jun. 2, 2017 for Chinese patent application No. 201380020694.9, a counterpart foreign application of U.S. Pat. No. 9,319,884.

"Device Management Architecture", Open Mobile Alliance, 2016, pp. 13-23, 30-32, 45-53, 93-99.

The European Office Action dated Nov. 29, 2018 for European Patent Application No. 12843678.9, a conterpart to U.S. Pat. No. 9,055,443, 5 pages.

The European Office Action dated Nov. 30, 2017 for European patent application No. 13778691.9, a counterpart foreign application of U.S. Pat. No. 9,319,884, 5 pages.

The European Office Action dated Mar. 9, 2018 for European Patent Application No. 12843678.9, a counterpart foreign application of U.S. Pat. No. 9,055,443, 8 pages.

The European Office Action dated May 8, 2018 for European patent application No. 13778922.8, a counterpart foreign application of U.S. Pat. No. 9,591,484, 4 pages.

The Extended European Search Report dated Nov. 11, 2015 for European patent application No. 1377892238, 6 pages.

The Extended European Search Report dated Nov. 27, 2015 for European patent application No. 13778691.9, 9 pages.

The Extended European Search Report dated May 20, 2015 for European Patent Application No. 12843678.9, 8 pages.

The PCT Search Report and Written Opinion dated Jul. 27, 2018, for PCT Application No. PCT/US18/27490, 11 pages.

Office Action for U.S. Appl. No. 13/660,350, dated Jan. 13, 2014, Ahmad Arash Obaidi, "Mobile Device-Type Locking", 8 pages.

Kanonov, U., "Secure Containers in Android: the Samsung KNOX Case Study", arXiv:1605.08567, May 27, 2016, pp. 1-19.

Office Action for U.S. Appl. No. 15/494,305, dated Jan. 10, 2018, Yasmin Karimli, "Network-based Device Locking Management", 16 pages.

Office action for U.S. Appl. No. 13/796,550, dated Jan. 11, 2016, Velusamy et al., "SIM Level Mobile Security", 20 pages.

Office action for U.S. Appl. No. 13/796,550, dated Jan. 12, 2018, Velusamy et al., "SIM Level Mobile Security", 27 pages.

Office Action for U.S. Appl. No. 13/796,550, dated Jan. 26, 2015, Senthil Kumar Mulluppadi Velusamy, "SIM Level Mobile Security", 18 pages.

Office Action for U.S. Appl. No. 13/842,116, dated Jan. 27, 2015, Ahmad Arash Obaidi, "Secure Lock for Mobile Device", 7 pages.

Office Action for U.S. Appl. No. 16/126,865, dated Oct. 12, 2018, Velusamy et al, "SIM Level Mobile Security", 9 pages.

Office action for U.S. Appl. No. 13/796,550, dated Nov. 10, 2016, Velusamy et al., "SIM Level Mobile Security", 23 pages.

Office Action for U.S. Appl. No. 13/840,045, dated Nov. 17, 2014, Adrian Buzescu, "Remote Unlocking of Telecommunication Device Functionality", 12 pages.

Office Action for U.S. Appl. No. 14/874,023, dated Dec. 21, 2015, Obaidi, ,"Secure Lock for Mobile Device", 7 pages.

Office Action for U.S. Appl. No. 13/839,189, dated Dec. 23, 2015, Ionescu et al., "Secure Environment for Subscriber Device", 14 pages.

Office Action for U.S. Appl. No. 13/839,189, dated Feb. 24, 2015, Alexandru Catalin Ionescu, "Secure Environment for Subscriber Device", 8 pages.

Office action for U.S. Appl. No. 13/796,550, dated Mar. 29, 2017, Velusamy et al., "SIM Level Mobile Security", 24 pages.

(56) References Cited

OTHER PUBLICATIONS

Office Action for U.S. Appl. No. 13/796,550, dated May 13, 2015, Senthil Kumar Mulluppadi Velusamy, "SIM Level Mobile Security", 18 pages.
Office Action for U.S. Appl. No. 13/796,550, dated May 23, 2016, Senthil Kumar Mulluppadi Velusamy, "SIM Level Mobile Security", 22 pages.
Office action for U.S. Appl. No. 13/839,189, dated Jul. 11, 2016, Ionescu et al., "Secure Environment for Subscriber Device", 15 pages.
Office Action for U.S. Appl. No. 13/660,350, dated Jul. 22, 2013, Obaidi, "Mobile Device-Type Locking", 8 pages.
Office action for U.S. Appl. No. 13/840,045, dated Jul. 29, 2015, Buzescu et al., "Remote Unlocking of Telecommunication Device Functionality", 10 pages.
Office Action for U.S. Appl. No. 13/840,045, dated Jul. 30, 2014, Buzescu et al., "Remote Unlocking of Telecommunication Device Functionality", 11 pages.
Office action for U.S. Appl. No. 13/839,189, dated Aug. 21, 2015, Ionescu et al., "Secure Environment for Subscriber Device", 7 pages.
Office Action for U.S. Appl. No. 13/796,550, dated Aug. 25, 2017, Senthil Kumar Mulluppadi Velusamy, "SIM Level Mobile Security", 25 pages.
Office action for U.S. Appl. No. 13/660,350, dated Aug. 7, 2014, Froelich et al., "Mobile Device-Type Locking", 8 pages.
"OMA Device Management Protocol", Open Mobile Alliance, 2016, pp. 7-16.
The PCT Search Report and Written Opinion dated Jan. 17, 2013 for PCT Application No. PCT/US12/62050, 10 pages.
The PCT Search Report and Written Opinion dated Jul. 1, 2013 for PCT Application No. PCT/US13/37345, 10 pages.
The PCT Search Report and Written Opinion dated Jul. 30, 2013 for PCT Application No. PCT/US13/37332, 13 pages.
The PCT Search Report and Written Opinion dated Sep. 17, 2013 for PCT Application No. PCT/US13/37381, 11 pages.
"Sim lock", Wikipedia, retrieved Jun. 30, 2017, from <<https://en.wikipedia.org/w/index.php?title=SIM_lock&oldid=715512588>>, pp. 1-12.
"Subscriber Identity Module", Wikipedia, retrieved Jun. 17, 2017, from <<https://en.wikipedia.org/w/index.php?title=Subscriber_identity_module&oldid=712259654>>, pp. 1-12.
The European Office Action dated Jul. 10, 2019 for European Patent Application No. 12843678.9, a counterpart of U.S. Pat. No. 9,055,443, 11 pages.
The European Office Action dated Dec. 17, 2019, for European patent application No. 13778922.8, a counterpart foreign application of U.S. Pat. No. 9,591,484, 5 pages.
The European Office Action dated Apr. 29, 2020 for European Patent Application No. 12843678.9, a counterpart foreign application of the U.S. Pat. No. 9,055,443, 9 pages.

\* cited by examiner

REMOTE SIM UNLOCK (RSU) IMPLEMENTATION USING BLOCKCHAIN

BACKGROUND

User equipment (UE) is often SIM locked by a carrier such that the UE cannot access another carrier's telecommunication network by using a subscriber identity module (SIM) associated with another carrier. UEs are often SIM locked if they have been purchased on an installment basis or are provided on a subsidized basis tied to a service contract, such that a subscriber cannot move the UE to another network before the UE is paid off or the contract term expires.

However, although a UE may be initially SIM locked, unlocking procedures can be performed to remove a SIM lock from a UE so that it can access other telecommunication networks. For example, a user who purchased a SIM locked UE from a first carrier can ask the first carrier to remove the SIM lock after the user has fully paid off the UE. After the UE has been SIM unlocked, the user can then use a SIM associated with a second carrier to access the second carrier's telecommunication network with the UE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

A subscriber identity module (SIM), such as a SIM card or a virtual SIM, can store information about a particular subscriber to services on a carrier's telecommunication network. For example, a SIM can store an international mobile subscriber identity (IMSI) that uniquely identifies a subscriber. A carrier can use a SIM's subscriber information to determine if a subscriber has an account with the carrier, which network services that subscriber has access to, and/or other information about the subscriber's account. A SIM can accordingly be used with a mobile phone or other user equipment (UE) to register with a carrier's telecommunication network and obtain network services, if the subscriber associated with the SIM has a valid subscription with the carrier.

In some examples SIMs can be inserted or removed from UEs, allowing for SIM swapping. However, a UE can be SIM locked such that the UE is limited to accessing a particular carrier's telecommunication network and cannot use a SIM associated with a different carrier to access the different carrier's telecommunication network. For example, if a subscriber purchases a UE from a carrier on an installment plan or on a subsidized basis tied to a service contract, the carrier may SIM lock the UE at least until the subscriber has paid off the UE or until the end of a contract term.

However, although a UE may initially be SIM locked to a particular carrier, the UE's SIM lock can be removed such that the UE is free to be used with other carriers. For example, after a SIM unlocking condition has been met, such as a subscriber paying off the UE or a contract term ending, a user can request that a carrier remove the SIM lock from the UE. Once the UE is SIM unlocked, the subscriber can be free to use another carrier's SIM with the UE to access the other carrier's telecommunication network. In some examples, a UE can be SIM unlocked temporarily for a period of time. For instance, when a subscriber to a particular carrier's services plans to travel to a country where the carrier's telecommunication network is not available, the subscriber can request that the carrier SIM unlock the subscriber's UE on a temporary basis such that the UE can be used while the subscriber is traveling.

In some cases, if a carrier's SIM unlock conditions have not been met or a carrier would not normally grant a permanent or temporary SIM unlock of a UE, a user may attempt other means of removing a SIM lock from their UE without the carrier's authorization. For example, a user can use social engineering or a bribe to convince a carrier's customer service representative to provide a code that SIM unlocks a UE. As another example, a hacker may be able to use unauthorized technical methods to obtain a SIM unlocking code or otherwise remove a SIM lock from a UE. Accordingly, such users may be able to remove a carrier's SIM lock from a UE so that it can be used with other carriers, even if the original carrier has not authorized the removal of the SIM lock.

Although a carrier may gain subscribers in this manner based on unauthorized removal of other carriers' SIM locks from UEs that are then moved to the carrier's telecommunication network, the carrier can also lose subscribers when its own subscribers remove the carrier's SIM locks without authorization to move their UEs to other carrier's telecommunication networks. Different carriers can accordingly have a common interest in ensuring that SIM locks are enforced. For example, a carrier based in the United States may not want to grant network access to a UE brought into the United States from China if the US-based carrier cannot verify that a Chinese carrier has authorized removal of a SIM lock on the UE. Similarly, a carrier may not want SIM locks on its own subscribers' UEs to be removed so that they can be used on other carriers without that carrier's permission.

Described herein are systems and methods by which a blockchain can store information about whether individual UEs are SIM locked, whether it is permissible to remove SIM locks from individual UEs, and/or whether individual UEs are to be disabled. The blockchain can be a permissioned blockchain that can be accessed and updated by multiple carriers and/or UE manufacturers. UEs can also access the blockchain on a read-only basis, such that a UE can determine from the blockchain if it is SIM locked and/or if it should be disabled. For example, a UE can determine from the blockchain at system boot that it is SIM locked and should only accept a SIM associated with a particular carrier, of that it is SIM unlocked and can accept SIMs associated with any carrier. As another example, if a UE has been reported as stolen, a carrier or UE manufacturer can update the blockchain to indicate that the UE should be disabled. Accordingly, upon system boot, a stolen UE can determine from the blockchain that it is to be disabled, and avoid booting into a normal operating environment such that its normal features are not available to users.

Example Environments

Figure 1:
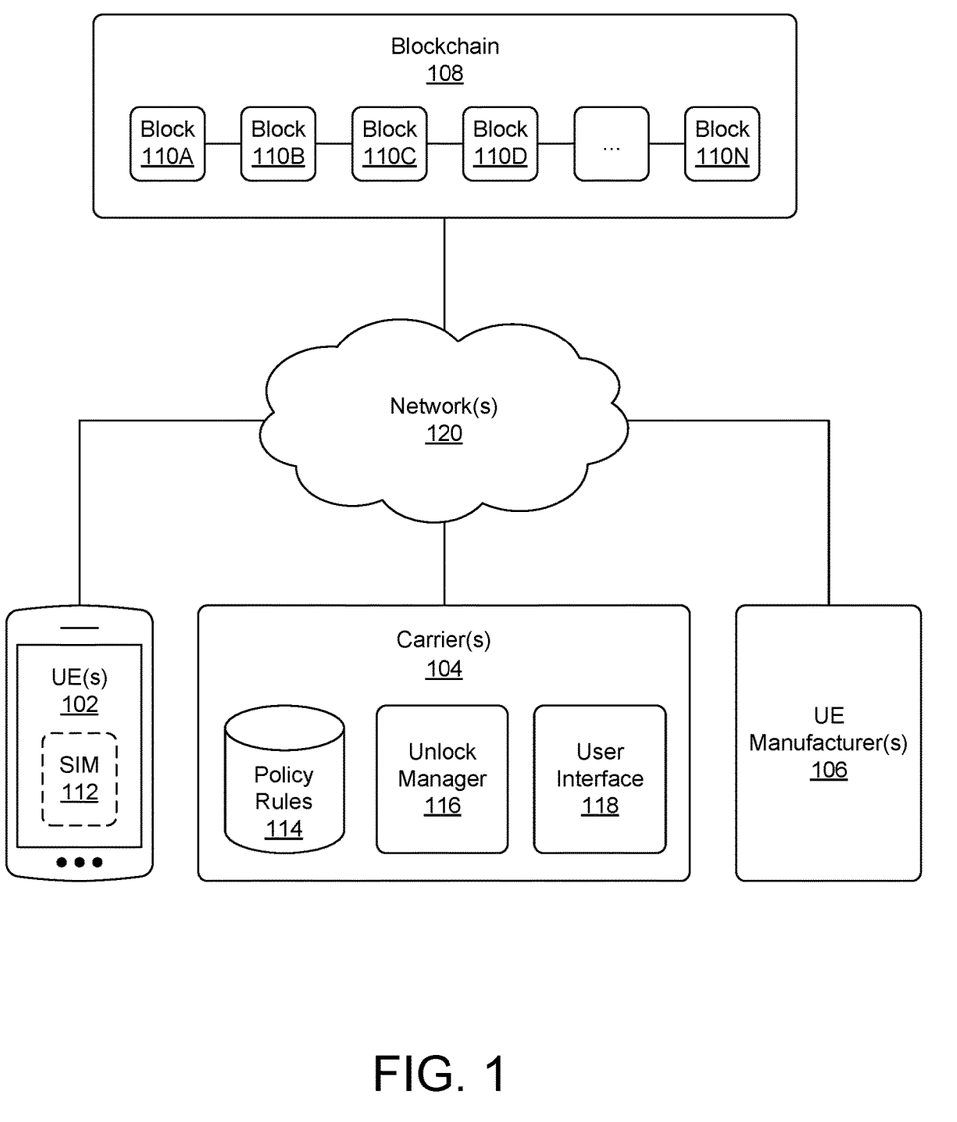
FIG. 1 depicts an example environment in which multiple entities can access a decentralized blockchain that stores data about user equipment (UE) SIM locks and/or whether UEs should be disabled.

FIG. 1 depicts an example environment in which user equipment (UE) 102, carriers 104, and/or UE manufacturers 106 can access a blockchain 108 that includes blocks 110 indicating whether individual UEs 102 are subject to SIM locks, whether it is permissible to remove SIM locks from those individual UEs 102, and/or whether individual UEs 102 should be disabled.

A UE 102 can be a mobile phone, a personal digital assistant (PDA), a tablet, a computer, a hotspot, a smart watch, or any other type of computing or communication device that can connect to a telecommunication network based on a subscriber identity module (SIM) 112. A UE can connect to one or more telecommunication networks to make or receive calls, transmit or receive messages and/or other data, and/or perform any other network operation. An example system architecture for a UE 102 is described in more detail below with respect to FIG. 3.

A carrier 104 can provide network services to UEs 102 over a telecommunication network. Connections between a UE 102 and a carrier's telecommunication network can be based on one or more wireless access technologies, including fifth generation (5G) wireless access technologies, fourth generation (4G) wireless access technologies, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, Wi-Fi, or any other earlier or later generation of wireless access technology.

A UE 102 can have a SIM 112, such as a removable SIM card inserted into the UE 102 or an electronic or virtual SIM. The SIM 112 can store information about a subscriber to a carrier's services, such as an international mobile subscriber identity (IMSI) or Subscription Permanent Identifier (SUPI) that uniquely identifies the subscriber. For example, an IMSI include a Mobile Country Code (MCC) for a particular country, a Mobile Network Code (MNC) for a particular carrier 104, and a Mobile Subscriber Identification number (MSIN) for a particular subscriber. The UE 102 can provide information retrieved from the SIM 112, or derived from the SIM 112, to a carrier 104 during network registration, so that the carrier 104 can determine if the subscriber has an account with the carrier 104, which network services that subscriber has access to, and/or other information about the subscriber's account with the carrier 104.

A UE 102 can be SIM locked so that the UE 102 can only obtain network services if the UE's SIM 112 contains information about an authorized subscriber to a particular carrier's services. For example, if a UE 102 is SIM locked by a first carrier 104 to restrict the UE 102 to being used on the first carrier's telecommunication network, the UE 102 would not permit itself to access a second carrier's telecommunication network even if a different SIM 112 associated with the second carrier 104 is inserted into the UE 102. In some examples, a UE 102 can be SIM locked by a carrier 104. In other examples, a UE 102 can be SIM locked by a UE manufacturer 106. For instance, if a UE manufacturer 106 builds a model of UE 102 exclusively for a particular carrier 104, the UE manufacturer 106 can SIM lock the UE 102 to that particular carrier 104 during manufacture.

However, in some cases an existing SIM lock can be permanently or temporarily removed when one or more SIM unlock conditions have been met. SIM unlock conditions can be based on contract status, an installment plan balance, whether a subscriber is in good standing with a carrier 104, whether an unlocking fee has been paid, and/or any other condition. As one example, when a subscriber purchases a UE 102 from a carrier 104 on an installment plan, the carrier 104 can place a SIM lock on the UE 102 subject to SIM unlock conditions indicating that the SIM lock can be removed when the subscriber pays off the balance of the installment plan. As another example, a carrier 104 can place a SIM lock on a UE 102 when the UE 102 is provided to a subscriber on a subsidized basis tied to a service contract, subject to SIM unlock conditions indicating that the SIM lock can be removed when the contract's term ends. As yet another example, SIM unlock conditions can indicate that a SIM lock on a UE 102 can be removed upon a subscriber's payment of an unlock fee.

A carrier 104 can have a database of policy rules 114 that define SIM unlock conditions for subscribers and/or UEs 102. The carrier 104 can also have an unlock manager 116 that can SIM lock and/or SIM unlock UEs 102 based on the policy rules 114. For example, an unlock manager 116 can determine based on policy rules 114 that one or more SIM unlock conditions for a particular UE 102 have been met, and respond by SIM unlocking the UE 102 automatically or upon a user's request. As will be discussed below, information about whether a UE 102 is SIM locked, and/or whether it is permissible to remove a SIM lock from a UE 102, can be stored in the blockchain 108. Accordingly, in some examples the unlock manager 116 can add information to the blockchain 108 when policy rules 114 indicate that a UE 102 should be SIM unlocked, or that removal of a UE's SIM lock is permissible.

The carrier 104 can also have a user interface (UI) 118 through which users can request SIM unlocking of a UE 102. For example, the UI 118 may be a web page or application through which a subscriber, or a customer service representative acting on the subscriber's behalf, can request a SIM unlock of a UE 102. As another example, the UI 118 may be an Interactive Voice Recorded (IVR) system that allows a subscriber or other user to call a phone number and interact with automated menus to request that a UE 102 be SIM unlocked.

When a SIM unlock request for a UE 102 is received via the UI 118, the unlock manager 116 can determine based on the policy rules 114 whether SIM unlock conditions associated with the UE 102 have been met and the UE 102 can be SIM unlocked. A carrier's policy rules 114, unlock manager 116, UI 118, and/or other services and elements, as well as their interactions when determining whether or not to SIM unlock a UE 102, are described in more detail in U.S. Pat. No. 9,319,884, entitled "Remote Unlocking of Telecommunication Device Functionality," issued on Apr. 19, 2016, as well as U.S. Pat. No. 9,591,484, entitled "Secure Environment for Subscriber Device," issued on Mar. 7, 2017, both of which are incorporated by reference herein. As discussed further below with respect to FIG. 3, in some examples a request to the carrier 104 to SIM unlock a UE 102 can also originate from an unlock application 324 running on the UE 102, and the unlock manager 116 can similarly respond to an unlock request from an unlock application 324 based on the policy rules 114.

If the unlock manager 116 determines from policy rules 114 that a UE 102 is to be SIM unlocked, the unlock manager 116 can update the blockchain 108 to indicate that the UE 102 not SIM locked. In some examples, the unlock manager 116 can also, or alternately, determine directly from the blockchain 108 whether SIM unlocking a particular UE 102 is permissible, and if so update the blockchain 108 to indicate that the UE 102 not SIM locked. For example, if the carrier 104 does not have its own policy rules 114 about a particular UE 102 because the UE 102 was most recently associated with a different carrier 104, but the blockchain 108 indicates that it is permissible to remove a SIM lock on that UE 102, the unlock manager 116 can update the blockchain 108 to reflect that the UE 102 is SIM unlocked.

In some examples, a carrier 104 or UE manufacturer 106 can cause a temporary SIM unlocking of a UE 102 by updating the blockchain to indicate that a UE 102 is SIM unlocked, then at a later point in time updating the blockchain again to indicate that a UE 102 is SIM locked. For example, a subscriber can request that a carrier 104 temporarily remove a SIM lock from a UE 102 for two weeks while the subscriber will be traveling in another country not covered by the carrier's telecommunication network. Upon such a request, if allowed by policy rules 114, the carrier 104 can update the blockchain 108 to indicate that the UE 102 is not SIM locked, but then after the temporary two-week period update the blockchain 108 again to indicate that the UE 102 is again SIM locked.

UEs 102, carriers 104, and/or UE manufacturers 106 can access the blockchain 108 via one or more networks 120, including telecommunication networks operated by the carriers 104, the Internet, and/or any other data network. The blockchain 108 can be a permissioned blockchain 108, such that only carriers 104 and/or UE manufacturers 106 with valid login credentials can update or add new information to the blockchain 108. However, in some examples UEs 102 can have "read-only" access to the blockchain 108 such that UEs 102 can look up or retrieve information in the blockchain 108 but are not permitted to update the blockchain 108 with new data.

Multiple copies of the blockchain 108 can be stored and maintained on a peer-to-peer basis at different network nodes, such as on servers maintained by the carriers 104, the UE manufacturers 106, and/or other entities. When the blockchain 108 is updated as discussed herein, each copy can be individually updated by the different network nodes so that the copies are synchronized and contain the same information. In some examples, if all copies are not completely synchronized but at least 51% of the copies contain the same information, the information on the at least 51% of the copes can be considered valid. Accordingly, the blockchain 108 can be a decentralized and carrier-agnostic data store that is not controlled or maintained by any single entity.

Because the blockchain 108 is decentralized and multiple identical copies can be maintained at different network nodes, in some examples a UE 102 can access the blockchain 108 directly without going through a carrier 104 or registering for a normal connection with a carrier's telecommunication network. For example, during boot-up of a UE, the UE 102 can use Wi-Fi, a specialized temporary connection to a carrier's telecommunication network to access the blockchain 108, or any other network connection to determine from the blockchain's information whether the UE is SIM locked or should be disabled. In some examples, the UE 102 can access the blockchain 108 during system boot, or at other times, via an application, operating system component, firmware component, or other agent, such as the unlock trustlet 318 described below with respect to FIG. 3.

Figure 2:
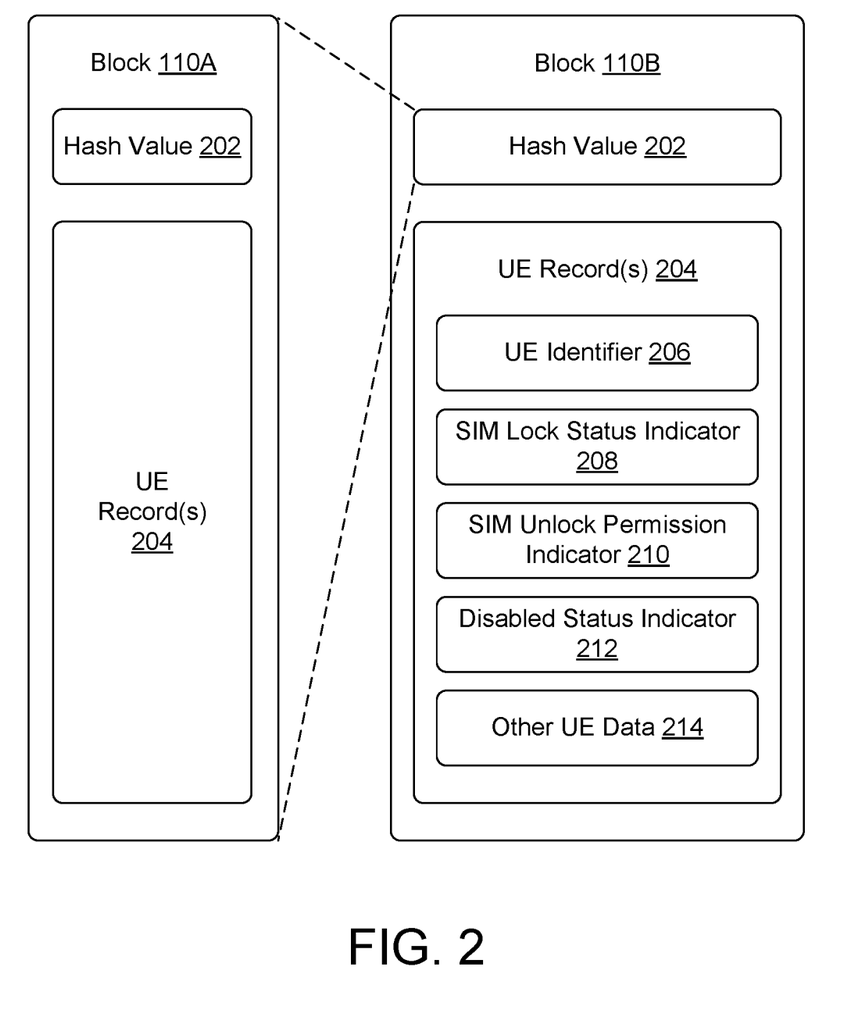
FIG. 2 depicts an example of blocks in a blockchain.

FIG. 2 depicts an example of blocks 110 in a blockchain 108. The blockchain 108 can include multiple blocks 110 that are linked together in sequence. The blocks 110 can store information about whether individual UEs 102 are subject to SIM locks and/or whether it is permissible to remove SIM locks from those individual UEs 102. In some examples, blocks 110 can also indicate whether individual UEs 102 are to be disabled.

Each block 110 in the blockchain 108 can store its own data as well as a hash value 202 cryptographically reflecting both a hash value 202 and other data that is stored in the preceding block 110 in the blockchain 108. For example, in FIG. 2, the hash value 202 stored in block 110B can be computed at least in part from the data in block 110A, including both the hash value 202 and UE records 204 stored in block 110A.

Because the hash value 202 of a block 110 is reflected in the next block 110, the blocks 110 can be considered to be linked together in a chain sequentially. The data in each individual block 110 can be verified as accurate if the hash value 202 for that block 110 is reflected by the subsequent block 110. The chaining of the blocks 110 can lead to confidence in the security of the data in the blockchain 108. For example, if data were modified in one block 110, the hash value 202 of that block 110 would change. Because the next block 110 contains the hash value 202 of the preceding block 110, the next block 110 would also need to be updated accordingly. That change to the next block 110 would similarly cause changes to its own hash value 202, requiring further modifications to the subsequent block 110 and causing a ripple effect that would require changes in all subsequent blocks 110 in the blockchain 108. Corresponding changes would also need to be made in other copies of the blockchain 108 maintained by other network nodes to keep the copies synchronized. Due to the technical difficulty of altering a block 110 and reflecting its changes in subsequent blocks 110, as well making such changes in multiple distinct copies of the blockchain 108 maintained at various network nodes to keep the copies synchronized, data stored in a blockchain 108 is often considered secure and essentially tamperproof.

In addition to the hash value 202 of the preceding block 110, a block 110 can also contain UE records 204 for one or more UEs 102. A UE record 204 can be specific to a particular UE 102, and can include a UE identifier 206, a SIM lock status indicator 208, a SIM unlock permission indicator 210, a disabled status indicator 212, and/or other UE data 214.

A UE identifier 206 can uniquely identify the UE 102. For example, a UE identifier 206 can include an international mobile equipment identity (IMEI) number, a Permanent Equipment Identity (PEI), a serial number, a model number, a manufacturer identifier, and/or other identifying information about the UE 102.

A SIM lock status indicator 208 can be a flag, code, or other value that indicates whether the UE 102 is, or is not, SIM locked. For example, a carrier 104 or a UE manufacturer 106 can place a SIM lock on a UE 102 by adding a block 110 to the blockchain 108 with a SIM lock status indicator 208 indicating that the UE 102 is SIM locked. As another example, when a user requests that a UE 102 be SIM unlocked and a SIM unlock condition has been met, a carrier 104 can add a block 110 to the blockchain 108 with a SIM lock status indicator 208 indicating that the UE 102 is not SIM locked. Accordingly, the carrier 104, other carriers 104, and/or the UE 102 itself can determine directly from the blockchain 108 whether or not the UE 102 is currently SIM locked. In some examples, when a SIM lock status indicator 208 indicates that a UE 102 is SIM locked, the SIM lock status indicator 208 or other associated data in the blockchain 108 can identify which carrier 104 the SIM lock is associated with, such that it can be determined if the UE's SIM 112 corresponds to that carrier 104.

A SIM unlock permission indicator 210 can be a flag, code, or other value that indicates whether it is permissible to SIM unlock a UE 102, regardless of whether the UE 102 remains SIM locked. For example, when a subscriber meets SIM unlock conditions for a UE 102 with a carrier 104, such as paying off the balance of an installment plan, the carrier 104 can add a block 110 to the blockchain 108 with a SIM unlock permission indicator 210 indicating that it is permissible to remove a SIM lock from the UE 102. In some cases, a SIM unlock permission indicator 210 may indicate that it is permissible to remove a SIM lock from a UE 102, even though a SIM lock status indicator 208 indicates that the UE 102 is SIM locked. This may be because a subscriber has paid off the UE 102 or met other SIM unlock conditions such that removal of a SIM lock would be permissible, but the subscriber has not yet requested that the UE 102 be SIM unlocked.

In some examples, a first carrier 104 can determine directly from a SIM lock status indicator 208 in the blockchain 108 that a UE 102 is currently SIM locked by a second carrier 104, but that the second carrier 104 has indicated in a SIM unlock permission indicator 210 that it is permissible to remove the SIM lock. Accordingly, the first carrier 104 can be free to remove the SIM lock for the UE 102 by adding a new block 110 with a SIM lock status indicator 208 indicating that the UE 102 is no longer SIM locked.

In some examples, a blockchain 108 can include both SIM lock status indicators 208 and SIM unlock permission indicators 210 as discussed above. However, in other example a blockchain 108 may have only one of SIM lock status indicators 208 and SIM unlock permission indicators 210. For example, a carrier 104 may directly indicate in a SIM lock status indicator 208 that a UE 102 is no longer SIM locked when SIM unlock conditions have been met, even if SIM unlocking is not specifically requested by a user. As another example, if when a UE 102 is booted the blockchain 108 indicates via a SIM unlock permission indicator 210 that it is permissible to remove a SIM lock from the UE 102, the UE 102 can consider any SIM lock that may have been present to be at least temporarily suspended such that the UE 102 can use another carrier's SIM 112 at least until the UE's check of the blockchain 108 at the next system boot.

A disabled status indicator 212 can be a flag, code, or other value that indicates whether a UE 102 should be disabled, regardless of whether the UE 102 is SIM locked. Disabling a UE 102 can include preventing the UE 102 from performing a normal boot process into a normal operating environment, including disabling network connections via Wi-Fi and/or telecommunication networks, such that users cannot use the UE 102 to browse the web, make calls, listen to music, run applications, and/or use any other feature of the UE 102. In some cases, a disabled UE 102 can still allow users to make emergency calls to 911 or other emergency numbers.

In some examples, a carrier 104 or UE manufacturer 106 can add a disabled status indicator 212 indicating that a particular UE 102 should be disabled when the UE 102 has been reported as stolen. For example, if a pallet of newly manufactured UEs 102 is stolen from a UE manufacturer 106, the UE manufacturer 106 can add blocks 110 to the blockchain 108 that identify the stolen UEs 102 by their UE identifiers 206 and indicate via disabled status indicators 212 that the stolen UEs 102 should be disabled. UEs 102 can be configured to check the blockchain 108 during their boot-up processes, and accordingly a stolen UE 102 can determine at boot-up from a disabled status indicator 212 in the blockchain 108 that should be disabled, and respond by not booting into a normal operating environment.

In some examples, if a UE 102 is hacked to cause it to attempt a network registration with a carrier 104 despite a disabled status indicator 212 in the blockchain 108 indicating that the UE 102 should be disabled, the carrier 104 can itself determine from the disabled status indicator 212 in the blockchain 108 that the UE 102 should be disabled. Although the carrier 104 may or may not be able to entirely disable the UE's normal functionality, in this situation the carrier 104 can deny the UE 102 a connection to its telecommunication network, thereby at least disabling the UE's ability to connect to that carrier 104. Because the blockchain 108 is decentralized and can be accessed by any authorized carrier 104, the UE 102 can be prevented from accessing any or all telecommunication networks even if it can be booted.

Because a stolen UE 102 can be entirely disabled and/or prevented from accessing telecommunication networks based on a disabled status indicator 212 in a blockchain 108 accessible by UEs 102, carriers 104, and UE manufacturers 106, the incentive to steal UEs can be reduced. Although data identifying stolen UEs 102 can also be stored in other databases, such as an Equipment Identity Register (EIR), unlike the blockchain 108 such databases may be centralized and thereby subject to a single point of failure, and/or may only be accessed by certain carriers 104.

Other UE data 214 can include information about a UE 102, such as a device username, device password, transactional information such as point of sale information and transaction history based on account identifiers, whether a master reset has been or is being performed, information about a last known owner, information about its operating system or other software, information about the last known carrier 104 associated with the UE 102, and/or any other type of data about a UE 102 or an associated subscriber. In some examples, some or all of the other UE data 214 can be encrypted and/or anonymized such that it is viewable and/or understandable only by authorized parties. For instance, a carrier 104 can add an anonymized number representing a last known owner of a UE 102 to the blockchain 108 in other UE data 214, so that the carrier 104 can later look up the anonymized number in its own internal records to find more information about the UE's last known owner. Accordingly, although the blockchain 108 itself can be decentralized and accessible by any authorized entity, some other UE data 214 held in the blockchain 108 can be encrypted or anonymized so that it is understandable only by certain entities.

In some examples, when the blockchain 108 contains blocks 110 with conflicting information, data stored in the most recently added one of those blocks 110 can take precedence over conflicting data in older blocks 110. For example, if an older block 110 has a SIM lock status indicator 208 indicating that a UE 102 is SIM locked, but the most recently-added block 110 with a UE record for that UE 102 has a SIM lock status indicator 208 indicating that the UE 102 is not SIM locked, then the blockchain 108 can be considered to indicate that the UE 102 is not SIM locked.

Accordingly, in some examples carriers 104 and/or UE manufacturers 106 can update the blockchain 108 by adding new blocks 110 with the most up to date information, rather than attempting to edit blocks 110 that are already part of the blockchain 108 and making corresponding changes to all subsequent blocks 110 as well as corresponding changes at distinct copies of the blockchain 108 held at different network nodes. However, because the blockchain 108 is a permissioned blockchain that can only be updated by certain authorized and trusted carriers 104 and/or UE manufacturers 106, in other examples an authorized carrier 104 or UE manufacturer 106 can edit an existing block 110 via a process that also updates subsequent blocks 110 and makes corresponding changes at copies of the blockchain 108 maintained at other network nodes.

In some examples, a newly added block 110 can contain a full UE record 204 that contains new and/or updated data for a UE 102, as well as copies of data from an older block 110 that is not being modified. In other examples, a newly added block 110 can contain a partial UE record 204 that has new or updated data for a UE 102, without new copies of unmodified data that continues to be stored in an older block 110, such that a full UE record 204 can be reconstructed from multiple blocks 110.

As discussed above, during a UE's boot-up process, the UE 102 can access the blockchain 108 to determine if the UE 102 should be disabled according to a disabled status indicator 212. If the blockchain 108 does not indicate that the UE 102 is to be disabled, during boot-up the UE 102 can also determine from the blockchain 108 whether or not the UE 102 is SIM locked. If the blockchain 108 indicates that the UE 102 is SIM locked and thereby restricted to accessing a particular carrier's telecommunication network, the UE 102 can enforce the SIM lock and disallow access to telecommunication networks of other carriers. If the blockchain 108 indicates that the UE 102 is not SIM locked, the UE 102 can allow access to telecommunication networks of other carriers.

Example Architecture

Figure 3:
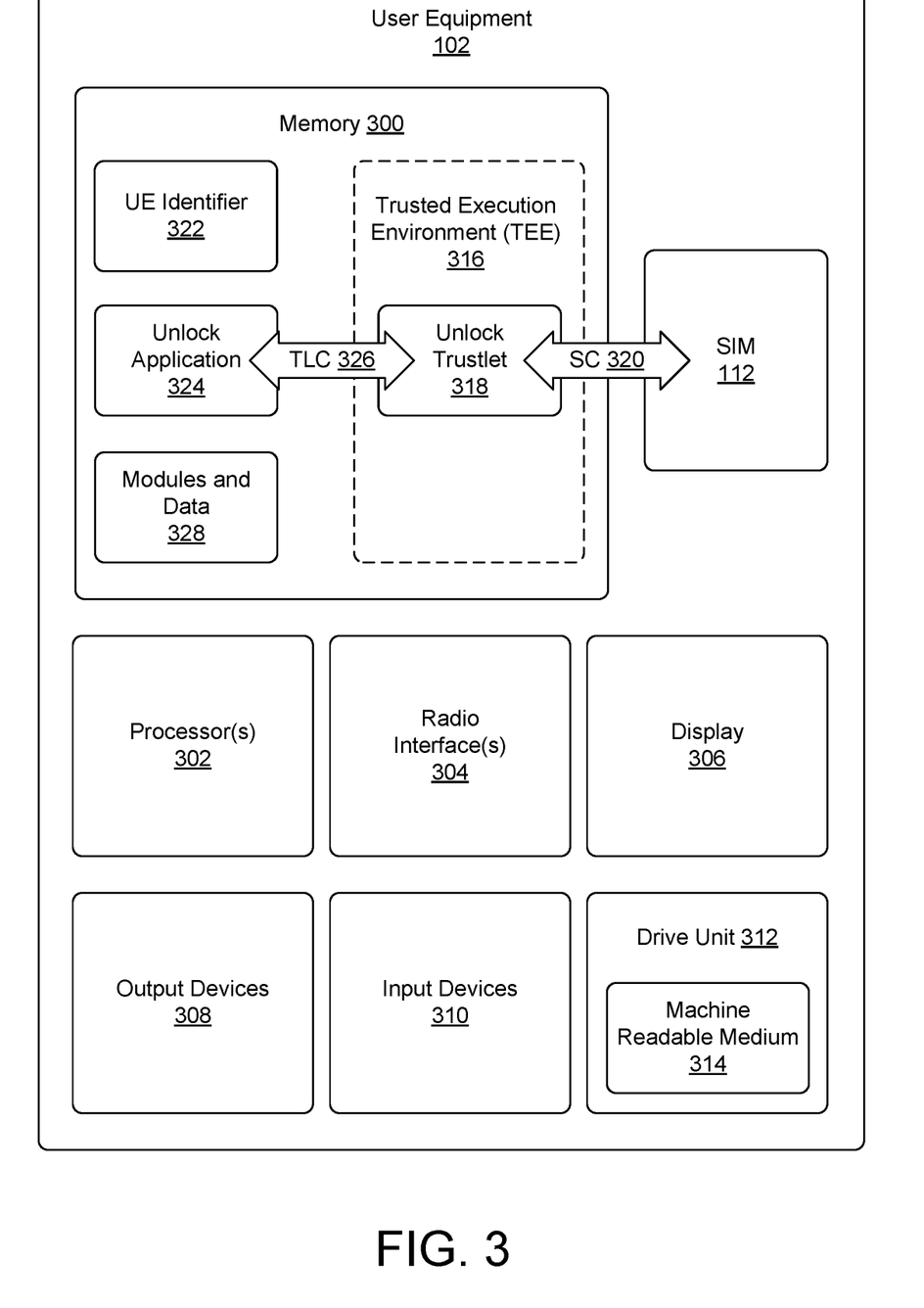
FIG. 3 depicts an example system architecture for a UE.

FIG. 3 depicts an example system architecture for a UE 102, in accordance with various examples. As shown, a UE 102 can have memory 300, a SIM 112, processor(s) 302, radio interfaces 304, a display 306, output devices 308, input devices 310, and/or a drive unit 312 including a machine readable medium 314.

In various examples, the memory 300 can include system memory, which may be volatile (such as RAM), non-volatile (such as ROM, flash memory, etc.) or some combination of the two. The memory 300 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

In some examples, the memory 300 can include a trusted execution environment (TEE) 316, such as dedicated memory module or memory partition that is separate from other portions of the memory 300. In some examples, elements of the TEE 316 can be run or accessed using a dedicated processor 302 and/or secure operating system that are separate from the processor(s) 302 and/or the UE's normal operating system that can run or access elements stored in memory 300 outside the TEE 316. Accordingly, elements of the TEE 316 can be run or accessed independently from elements outside the TEE 316. For example, elements of the TEE 316 can be run or accessed independently during system boot of the UE 102 to prevent unauthorized access of the TEE 316.

An unlock trustlet 318 can be stored and run in the TEE 316. The unlock trustlet 318 can be configured to communicate with the SIM 112, at least at system boot, via a secure communication channel 320. For example, the unlock trustlet 318 can retrieve an IMSI or other subscriber identifier from the SIM 112 via the secure communication channel 320. A UE's TEE 316 and trustlets in the TEE 316, such as an unlock trustlet 318 that can interact with a SIM 112 and/or other elements outside the TEE 316, are described in more detail in U.S. Pat. No. 9,319,884, entitled "Remote Unlocking of Telecommunication Device Functionality," issued on Apr. 19, 2016, as well as U.S. Pat. No. 9,591,484, entitled "Secure Environment for Subscriber Device," issued on Mar. 7, 2017, both of which are incorporated by reference herein.

The unlock trustlet 318 can also be configured to access the blockchain, at least during system boot, to determine if the UE 102 should be disabled and/or whether the UE 102 is SIM-locked. The UE's memory 300 can store a UE identifier 322, which may be the same as the UE identifier 206 in the blockchain 108 that uniquely identifies the UE 102, in the memory 300 generally or in the TEE 316. The unlock trustlet 318 can use one or more radio interfaces 304 to access the blockchain 108 via a network connection, locate UE records 204 in one or more blocks 110 that have a UE identifier 206 matching the UE identifier 322, and identity a SIM lock status indicator 208, SIM unlock permission indicator 210, disabled status indicator 212, and/or other UE data 214 in the UE records 204 that are applicable to the UE 102.

If the unlock trustlet 318 determines during system boot that a disabled status indicator 212 in the blockchain 108 indicates that the UE 102 should be disabled, for instance if the UE 102 has been stolen, the unlock trustlet 318 can prevent the UE 102 from continuing its boot process and from entering a normal operating environment. In this situation, the unlock trustlet 318 may also deactivate radio interfaces 304 and/or other hardware elements of the UE 102.

However, if the blockchain 108 does not indicate that the UE 102 should be disabled, the unlock trustlet 318 can determine if the blockchain 108 indicates whether or not the UE 102 is SIM locked to a particular carrier 104. If the blockchain 108 indicates that the UE 102 is not SIM locked, the unlock trustlet 318 can allow the UE 102 to attempt to register on any telecommunication network based on subscriber information retrieved from the SIM 112. However, if the blockchain 108 indicates that the UE 102 is SIM locked to a particular carrier 104, the unlock trustlet 318 can allow the UE 102 to only attempt to register on that carrier's telecommunication network and/or can verify that subscriber information retrieved from the SIM 112 corresponds to that particular carrier 104.

In some examples, if the blockchain 108 does not indicate that the UE 102 is SIM unlocked, but the blockchain 108 does have a SIM unlock permission indicator 210 indicating that SIM unlocking the UE 102 is permissible, the unlock trustlet 318 can temporarily allow the UE 102 to access telecommunication networks of any carrier 104. This temporary SIM unlocking can persist until the next system boot, at which point the unlock trustlet 318 can again check the blockchain 108 to determine if the most recent data indicates that the UE 102 is still SIM locked and/or whether SIM unlocking is still permissible. For example, although the blockchain 108 can be permissioned such that a UE 102 cannot update the blockchain 108 to indicate that the UE 102 is no longer SIM locked even if a SIM unlock permission indicator 210 indicates that SIM unlocking is permissible, the unlock trustlet 318 can follow the SIM unlock permission indicator 210 to effectively remove the SIM lock and temporarily allow the UE 102 to access any carrier's telecommunication network until a similar check of the blockchain 108 at the next system boot.

An unlock application 324 can be stored and/or run in the memory 300 outside the TEE 316. In some examples, the unlock application 324 can be at least temporarily connected to the unlock trustlet 318 in the TEE 316 via a trusted layer connector 326. Connections between an unlock application 324 and a trustlet in the TEE 316 via a trusted layer connector 326 are described in more detail in U.S. Pat. No. 9,319,884, entitled "Remote Unlocking of Telecommunication Device Functionality," issued on Apr. 19, 2016, as well as U.S. Pat. No. 9,591,484, entitled "Secure Environment for Subscriber Device," issued on Mar. 7, 2017, both of which are incorporated by reference herein.

The unlock application 324 can have a user interface that can indicate whether or not the UE 102 is SIM locked and/or whether the UE 102 is permitted to be SIM unlocked, and/or can allow a user to request that the UE 102 be SIM unlocked. For example, after system boot, the unlock application 324 can communicate with the unlock trustlet 318 to determine if the unlock trustlet 318 found during system boot that the blockchain 108 indicated that the UE 102 was SIM locked and/or is permitted to be SIM unlocked. For example, based on information provided by the unlock trustlet 318 from its own check of the blockchain 108, the unlock application 324 can display in a user interface that the UE 102 is not SIM locked, that the UE 102 is SIM locked and cannot be SIM unlocked, or that the UE 102 is SIM locked but a SIM unlock can be requested.

If the unlock trustlet 318 indicates that UE 102 is SIM locked but a SIM unlock would be permitted, the unlock application 324 can display an option that, if selected by a user, transmits a SIM unlock request to a carrier's unlock manager 116. In response to the SIM unlock request from the unlock application 324, the carrier's unlock manager 116 can determine from the policy rules 114 and/or the blockchain 108 that SIM unlocking the UE 102 is permissible, and add a block 110 with a SIM lock status indicator 208 indicating that the UE 102 is not SIM locked. The carrier's unlock manager 116 may return a SIM unlock confirmation message to the unlock application 324, and the unlock application 324 can display a notification in its user interface that the requested SIM unlock was successful and will be implemented upon rebooting the UE 102. Accordingly, the next time the UE 102 is rebooted, the unlock trustlet 318 would determine from the new information in the blockchain 108 that the UE 102 is no longer SIM locked and can connect to other telecommunication networks, and that information can also be displayed to users via the unlock application 324.

The memory 300 can also store other modules and data 328 that can be utilized by the UE 102 to perform or enable performing any action taken by the UE 102. The modules and data 328 can include a UE platform, operating system, and applications, and data utilized by the platform, operating system, and applications. Moreover, although the unlock trustlet 318 is described above as running within a TEE 316 and interacting with a SIM 112, an unlock application 324, radio interfaces 304, and/or other elements of the UE 102, in alternate examples in which the UE 102 does not have a TEE 316, analogous procedures may also be carried out by dedicated software that is stored as other modules and data 328 within the memory 300 of the UE 102. In this scenario, the dedicated software may or may not be logically separated from an operating system and/or other applications on the UE 102.

In various examples, the processor(s) 302 can be a central processing unit (CPU), a graphics processing unit (GPU), or both CPU and GPU, or any other type of processing unit. Each of the one or more processor(s) 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing all computer applications stored in the memory 300, which can be associated with common types of volatile (RAM) and/or nonvolatile (ROM) memory. As discussed above, in some examples one or more processors 302 can be dedicated to the TEE 316.

The radio interfaces 304 can include transceivers, modems, interfaces, antennas, and/or other components that perform or assist in exchanging radio frequency (RF) communications with a base station of a wireless telecommunication network, a Wi-Fi access point, or otherwise implement connections with one or more networks 120. The radio interfaces 304 can be compatible with 5G wireless access technologies, 4G/LTE wireless access technologies, other legacy wireless access technologies, Wi-Fi, and/or any other type of wireless connection.

The display 306 can be a liquid crystal display or any other type of display commonly used in UEs 102. For example, display 306 may be a touch-sensitive display screen, and can then also act as an input device or keypad, such as for providing a soft-key keyboard, navigation buttons, or any other type of input.

The output devices 308 can include any sort of output devices known in the art, such as a display 306, speakers, a vibrating mechanism, and/or a tactile feedback mechanism. Output devices 308 can also include ports for one or more peripheral devices, such as headphones, peripheral speakers, and/or a peripheral display.

The input devices 310 can include any sort of input devices known in the art. For example, input devices 310 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 314 can store one or more sets of instructions, such as software or firmware, that embodies any one or more of the methodologies or functions described herein. The instructions can also reside, completely or at least partially, within the memory 300, TEE 316, processor(s) 302, and/or radio interface(s) 304 during execution thereof by the UE 102. The memory 300 and the processor(s) 302 also can constitute machine readable media 314.

Example Operations

Figure 4:
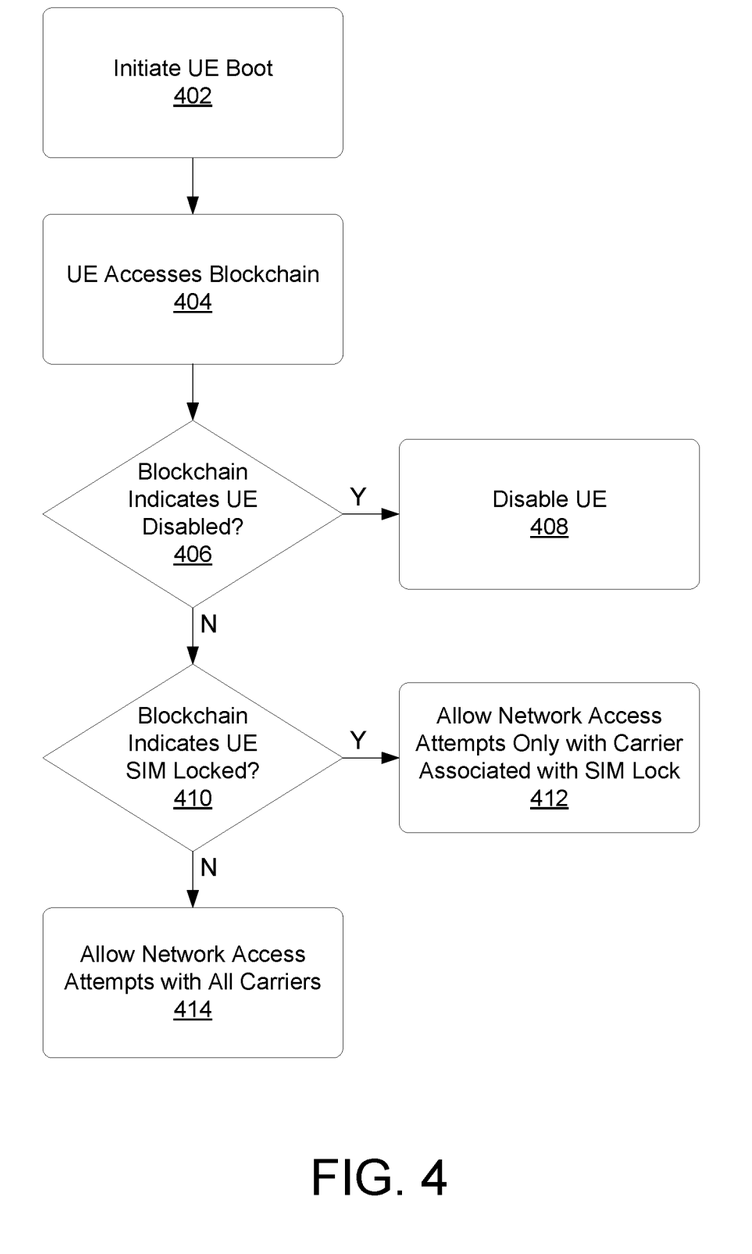
FIG. 4 depicts an example process by which a UE can use a blockchain to determine if the UE should be disabled, and/or whether the UE is SIM locked.

FIG. 4 depicts an example process by which a UE 102 can use the blockchain 108 to determine if the UE 102 should be disabled, and if not whether the UE 102 is SIM locked. In some examples, the process of FIG. 5 can be implemented by an unlock trustlet 318 running in a TEE 316. In other examples, the process of FIG. 5 can be implemented by any other element of the UE 102, such as a firmware component, operating system component, or dedicated application.

At 402, a boot process for the UE 102 can be initiated. For example, the boot process can begin when the UE 102 is powered on or rebooted.

At 404, the UE 102 can access the blockchain 108 during the boot process. For example, the UE 102 can use a radio interface 304 to at least temporarily connect to a network node that maintains a copy of the blockchain 108. The UE 102 can search the blockchain 108 for UE records 204 that match the UE's own UE identifier 322. In some examples, the UE 102 can search for the most recently added UE records 204 for the UE 102, because UE records 204 in blocks 110 added more recently to the blockchain 108 can take precedence over UE records 204 in older blocks 110.

At 406, the UE 102 can determine if the UE records 204 in the blockchain 108 include a disabled status indictor 212 indicating that the UE 102 should be disabled. If the UE 102 determines that a disabled status indictor 212 indicates that the UE 102 should be disabled, the UE 102 can move to 408 and disable the UE 102 by not continuing to boot the UE 102 into a normal operating environment. In some examples, a disabled UE 102 may maintain functionality allowing users to make emergency calls. If the blockchain 108 does not indicate that the UE 102 should be disabled, the UE 102 can move to 410.

At 410, the UE 102 can determine if the UE records 204 in the blockchain 108 include a SIM lock status indicator 208 indicating that the UE 102 is SIM locked. If the blockchain 108 does indicate that the UE 102 is SIM locked, the UE 102 can move to 412. Otherwise, if the blockchain 108 indicates that the UE 102 is not SIM locked, the UE can move to 414.

At 412, the UE 102 can enforce a SIM lock identified in the blockchain 108 by only allowing itself to access a telecommunication network of a particular carrier 104 associated with the SIM lock and disallowing connections to telecommunication networks of other carriers 104. In some examples, the UE 102 can determine from the blockchain 108 or its own local data which carrier 104 the UE 102 is restricted to when a SIM lock is to be enforced. Accordingly, in some examples the UE 102 can determine at 412 if its current SIM 112 is associated with that carrier 104, and/or only allow network registration attempts with that carrier 104.

However, if at 410 the UE 102 determines that the blockchain 108 does not indicate that the UE 102 is SIM locked, at 414 the UE 102 can allow network registration attempts with any carrier 104 based on information in the UE's current SIM 112. The carriers 104 themselves may allow or disallow network registrations based on data in the SIM 112.

Figure 5:
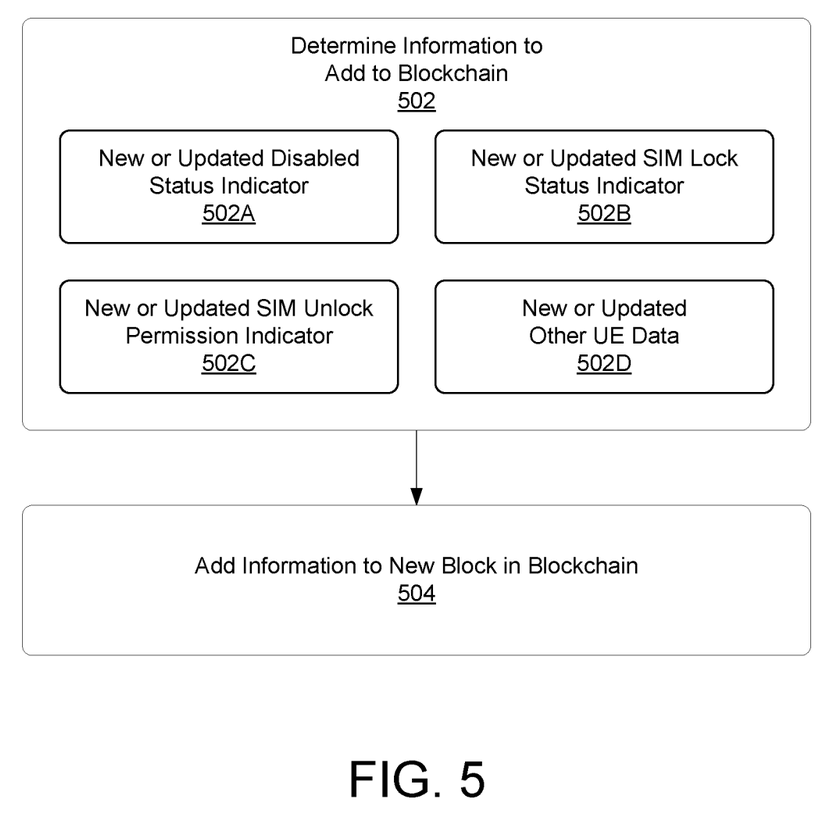
FIG. 5 depicts an example process by which an authorized entity can update a blockchain.

FIG. 5 depicts an example process by which an authorized entity, such as a carrier 104 or UE manufacturer 106, can update a blockchain 108. As discussed above, a blockchain 108 can be a permissioned blockchain such that only authorized entities, such as carriers 104 and/or UE manufacturers 106 with valid credentials, can update the blockchain 108 by adding new blocks 110 with new or different information.

At 502, the authorized entity can determine new or updated information to be added to the blockchain 108. The information to be added can include a new or updated SIM lock status indicator 208, new or updated SIM unlock permission indicator 210, new or updated disabled status indicator 212, and/or new or updated other UE data 214.

For example, the authorized entity may have received a report indicating that a UE 102 has been stolen, and determine at 502A that a new or updated disabled status indicator 212 should be added to the blockchain 108 to indicate that the stolen UE 102 is to be disabled.

As another example, at 502B the authorized entity may determine that a new or updated SIM lock status indicator 208 should be added to the blockchain 108 to indicate that a UE 102 is SIM locked or is not SIM locked. For instance, when a carrier 104 or UE manufacturer 106 wants to put a SIM lock on a UE 102 initially or after a temporary unlocking period, the carrier 104 or UE manufacturer 106 may want to add a new or updated SIM lock status indicator 208 to the blockchain 108 indicating that a UE 102 is SIM locked. Alternately, if a carrier 104 determines on its own or based on a user request that a SIM lock on a UE 102 should be removed, the carrier 104 may want to update the blockchain 108 with a new or updated SIM lock status indicator 208 reflecting that the UE 102 is no longer SIM locked.

As yet another example, at 502C the authorized entity may determine that a new or updated SIM unlock permission indicator 210 should be added to the blockchain 108 to indicate that SIM unlocking a UE 102 is permissible. For instance, when a carrier's policy rules 114 indicate that a subscriber has satisfied SIM unlock conditions, the carrier 104 can determine that the blockchain 108 should be updated with a new or updated SIM unlock permission indicator 210 reflecting that an associated UE 102 is permitted to be SIM unlocked, even if such SIM unlocking has not yet been requested by a user.

As another example, at 502D the authorized entity may determine that new or updated other UE data 214 should be added to the blockchain 108. For example, a carrier 104 may have received information indicating that a new user has purchased a particular UE 102, and want to update the blockchain 108 to reflect that new user is now the last known owner of the UE 102 in other UE data 214.

At 504, the authorized entity can add a UE record 204 reflecting the new or updated information to a new block 110 in the blockchain 108. In some examples, the authorized entity can submit the new or updated information for a UE record 204 to a network node that maintains a copy of the blockchain 108, and the network node can combine that UE record 204 with other UE records 204 when generating a new block 110. The new block 110 can reflect a hash value 202 of the preceding block 110. The network node can distribute the new or updated information, and/or the new block 110, to other network nodes, such that the other network nodes can update their own copies of the blockchain 108 with the new information in a new block 110 to keep the copies of the blockchain 108 synchronized.

Figure 6:
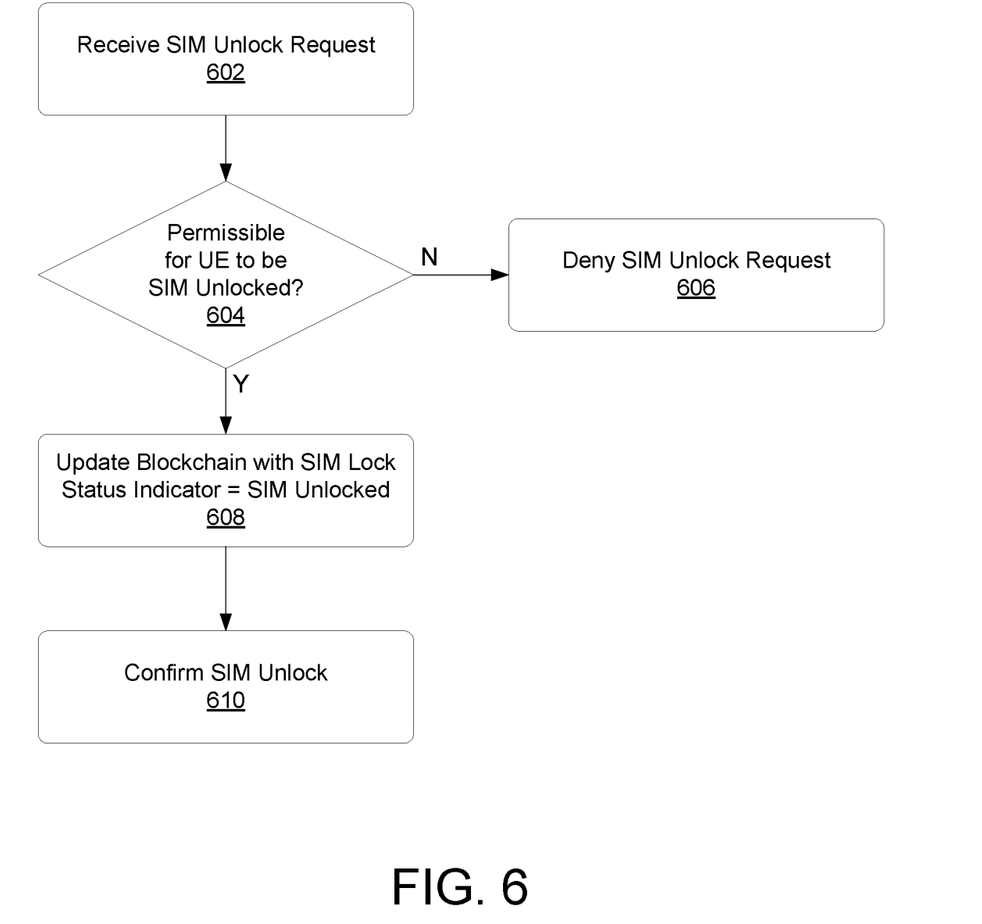
FIG. 6 depicts an example process by which a carrier can process a SIM unlock request associated with a SIM locked UE.

FIG. 6 depicts an example process by which a carrier 104 can process a SIM unlock request associated with a SIM locked UE 102.

At 602, the carrier 104 can receive a SIM unlock request for a UE 102. In some examples, the SIM unlock request can originate from a UE 102, such as via an unlock application 324 running on the UE 102. In other examples, the SIM unlock request can be submitted by a subscriber, customer service representative, or other user via a UI 118 provided by the carrier 104. In still other examples, the SIM unlock request can be an implied when a SIM locked UE 102 that was not previously associated with the carrier 104 attempts to register with the carrier's telecommunication network.

At 604, the carrier 104 can determine if the UE 102 is permitted to be SIM unlocked. In some examples, the carrier 104 can use its own policy rules 114 to determine whether the UE 102 qualifies for SIM unlocking. In other examples, the carrier 104 can access the blockchain 108 to determine if a SIM unlock permission indicator 210 added by the carrier 104 or another authorized entity, such as a different carrier 104, indicates that it is permissible to remove a SIM lock on the UE 102. If the carrier 104 determines at 604 that it is not permissible to remove a SIM lock from the UE 102, the carrier 104 can deny the SIM unlock request at 606.

However, if at 604 the carrier 104 determines that it is permissible to remove a SIM lock from the UE 102, at 608 the carrier 104 can update the blockchain 108 to include a UE record 204 with a SIM lock status indicator 208 specifying that the UE 102 is not SIM locked. For example, the carrier 104 can use the process described above with respect to FIG. 5 to add a block 110 to the blockchain 108 with a SIM lock status indicator 208 specifying that the UE 102 is not SIM locked.

In some examples, the carrier 104 can also respond to the SIM unlock request with a SIM unlock confirmation message at 610. For example, the carrier 104 can display a notification in the carrier's UI 118 indicating that the UE 102 will no longer be SIM locked upon the next boot of the UE 102, or send a confirmation message to a UE's unlock application 324 indicating that the UE 102 will no longer be SIM locked upon the next boot of the UE 102. When the UE 102 is next booted, the UE 102 can use the process of FIG. 4 to verify directly from the blockchain 108 that it is no longer SIM locked.

Figure 7:
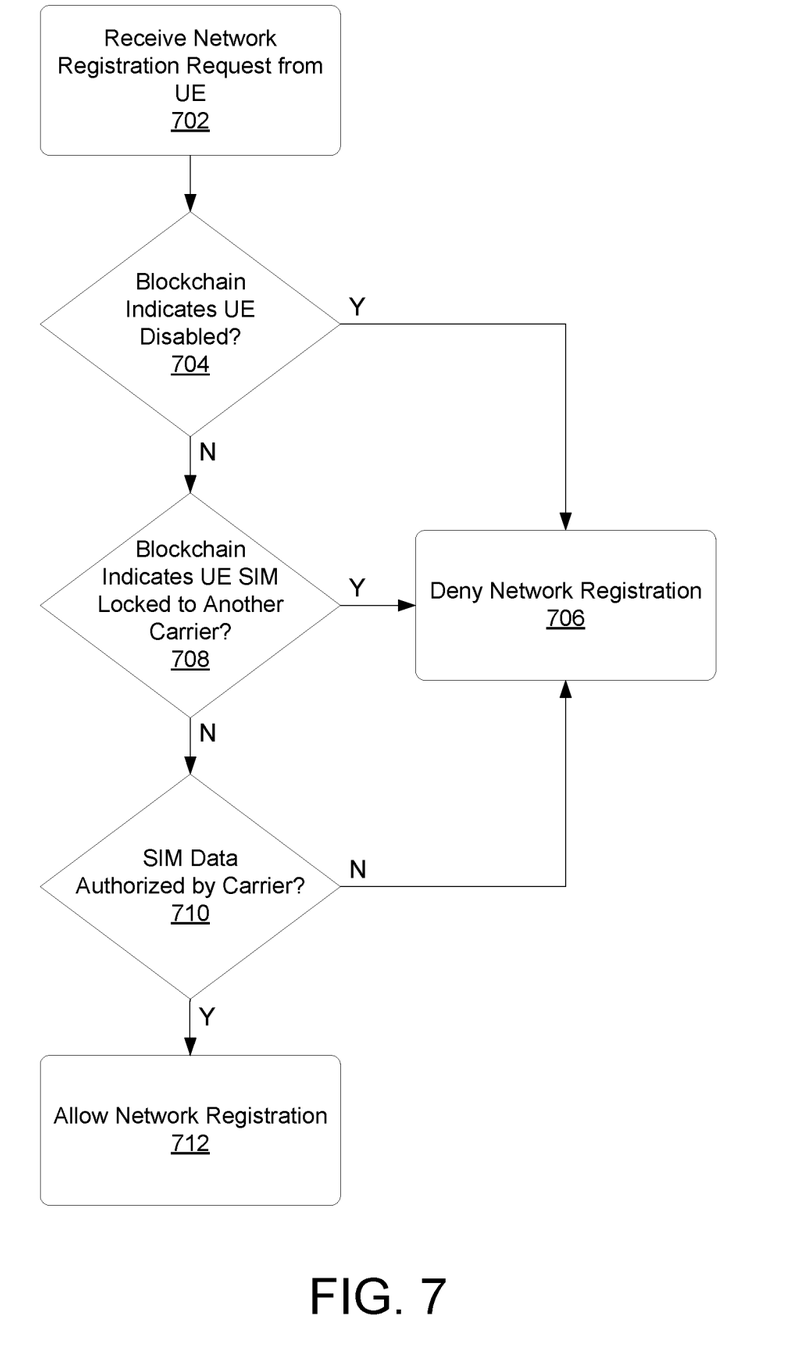
FIG. 7 depicts an example process by which a carrier can process a network registration request from a UE.

FIG. 7 depicts an example process by which a carrier 104 can process a network registration request from a UE 102. In some examples, the network registration request can be a Session Initiation Protocol (SIP) message, or any other type of message sent by the UE 102 to a carrier's base station and then forwarded to a core network and/or IP Multimedia Subsystem (IMS) of the carrier 104 for authorization and/or authentication. Accordingly, in various examples, elements of a base station, a core network, or an IMS associated with a carrier 104 can perform any or all of the operations of FIG. 7.

At 702, the carrier 104 can receive a network registration request from a UE 102. As part of the network registration request, the UE 102 may provide its UE identifier 322, such as an IMEI, as well as data from its SIM 112, such as an IMSI or other subscriber identifier.

At 704, the carrier 104 can access the blockchain 108 to determine if a disabled status indicator 212 indicates that the UE 102 is to be disabled. For example, the carrier 104 can search the blockchain 108 for a UE record 204 with a UE identifier 206 matching the UE identifier 322 provided in the UE's network registration request, and determine if that UE record 204 includes a disabled status indicator 212 indicating that the UE 102 is to be disabled. If a disabled status indicator 212 in the blockchain 108 does indicate that the UE 102 is to be disabled, the carrier 104 can deny the UE's network registration request at 706. Otherwise, the carrier 104 can move to 706.

At 706, the carrier 104 can access the blockchain 108 to determine if a SIM lock status indicator 208 indicates that the UE 102 is SIM locked, and if so whether the UE 102 is SIM locked to a different carrier 104. In some examples, if the blockchain 108 indicates the UE 102 is SIM locked to a different carrier 104, but a SIM unlock permission indicator 210 indicates that it would be permissible to remove that SIM lock, the carrier 104 can update the blockchain 108 to remove the SIM lock by adding a new SIM lock status indicator 208 in a new block 110 indicating that the UE 102 is no longer SIM locked, as discussed above with respect to FIG. 5. If the blockchain 108 indicates that the UE 102 is SIM locked to another carrier and does not indicate that the SIM lock is permitted to be removed, the carrier 104 can deny the UE's network registration request at 706. Otherwise, the carrier 104 can move to 708.

At 708, if the blockchain does not indicate that the UE 102 is to be disabled and that the UE 102 is SIM locked to a different carrier 104, the carrier 104 can attempt to authorize and/or authenticate the UE 102 based on the SIM data received in the network registration request at 702. If the SIM data cannot be authenticated and/or authorized, the carrier 104 can deny the UE's network registration request at 706. Otherwise, if the SIM data can be authenticated and authorized, the carrier 104 can allow the UE's network registration request at 712 and grant the UE 102 access to the carrier's telecommunication network.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
accessing, by a user equipment (UE), a blockchain during boot-up of the UE, wherein the blockchain is accessible to UEs of multiple carriers;
determining, by the UE during boot-up, that the blockchain indicates that the UE is subscriber identity module (SIM) locked to a carrier of the multiple carriers;
responsive to determining that the blockchain indicates that the UE is SIM locked to the carrier, disallowing, by the UE, attempts to register the UE with telecommunication networks that are not associated with the carrier;
determining, by the UE during boot-up, that the blockchain indicates that the UE is to be disabled; and
responsive to determining that the blockchain indicates that the UE is to be disabled, avoiding, by the UE, booting into a normal operating environment.

2. The method of claim 1, further comprising:
allowing, by the UE, attempts to register the UE with a telecommunication network associated with the carrier at least in part by sending the carrier subscriber data retrieved or derived from a SIM of the UE.

3. The method of claim 1, wherein the blockchain is a permissioned blockchain configured to be updated by a plurality of authorized entities including one or more of: the carrier, other carriers, or UE manufacturers.

4. The method of claim 1, wherein the blockchain indicates that the UE is to be disabled when the UE has been reported as stolen to an authorized entity and the authorized entity updated the blockchain with a disabled status indicator indicating that the UE is to be disabled.

5. The method of claim 1, further comprising:
sending, by the UE, a SIM unlock request to the carrier requesting that the carrier update the blockchain to indicate that the UE is not SIM locked;
determining, by the UE during a subsequent boot-up, that the blockchain indicates that the UE is not SIM locked in association with the carrier; and
responsive to determining that the blockchain indicates that the UE is not SIM locked in association with the carrier, allowing, by the UE, subsequent attempts to register the UE with the telecommunication networks that are not associated with the carrier.

6. The method of claim 1, wherein an unlock trustlet executing in a trusted execution environment in memory of the UE accesses the blockchain during boot-up and disallows the attempts to register the UE with the telecommunication networks that are not associated with the carrier when the blockchain indicates that the UE is SIM locked in association with the carrier.

7. A user equipment (UE) comprising:
one or more processors; and
memory storing computer-executable instructions that, when executed by the one or more processors, cause the UE to perform operations comprising:
accessing a blockchain during boot-up of the UE, wherein the blockchain is accessible to UEs of multiple carriers;
determining, during boot-up, that the blockchain indicates that the UE is subscriber identity module (SIM) locked to a carrier of the multiple carriers;
responsive to determining that the blockchain indicates that the UE is SIM locked to the carrier, disallowing attempts to register the UE with telecommunication networks that are not associated with the carrier;
determining, during boot-up, that the blockchain indicates that the UE is to be disabled; and
responsive to determining that the blockchain indicates that the UE is to be disabled, avoiding booting into a normal operating environment.

8. The UE of claim 7, wherein the operations further comprise:
allowing attempts to register the UE with a telecommunication network associated with the carrier at least in part by sending the carrier subscriber data retrieved or derived from a SIM of the UE.

9. The UE of claim 7, wherein the blockchain is a permissioned blockchain configured to be updated by a plurality of authorized entities including one or more of: the carrier, other carriers, or UE manufacturers.

10. The UE of claim 7, wherein the blockchain indicates that the UE is to be disabled when the UE has been reported as stolen to an authorized entity and the authorized entity updated the blockchain with a disabled status indicator indicating that the UE is to be disabled.

11. The UE of claim 7, wherein the operations further comprise:
sending a SIM unlock request to the carrier requesting that the carrier update the blockchain to indicate that the UE is not SIM locked;
determining, during a subsequent boot-up, that the blockchain indicates that the UE is not SIM locked in association with the carrier; and
responsive to determining that the blockchain indicates that the UE is not SIM locked in association with the carrier, allowing subsequent attempts to register the UE with the telecommunication networks that are not associated with the carrier.

12. The UE of claim 7, wherein the memory further comprises a trusted execution environment storing an unlock trustlet that accesses the blockchain during boot-up and disallows the attempts to register the UE with the telecommunication networks that are not associated with the carrier when the blockchain indicates that the UE is SIM locked in association with the carrier.

13. A non-transitory computer-readable storage medium having stored thereon computer-executable instructions that, when executed by a user equipment (UE), cause the UE to perform operations comprising:
accessing a blockchain during boot-up of the UE, wherein the blockchain is accessible to UEs of multiple carriers;
determining, during boot-up, that the blockchain indicates that the UE is subscriber identity module (SIM) locked to a carrier of the multiple carriers;
responsive to determining that the blockchain indicates that the UE is SIM locked to the carrier, disallowing attempts to register the UE with telecommunication networks that are not associated with the carrier;
determining, during boot-up, that the blockchain indicates that the UE is to be disabled; and
responsive to determining that the blockchain indicates that the UE is to be disabled, avoiding booting into a normal operating environment.

14. The non-transitory computer-readable storage medium of claim 13, wherein the operations further comprise:
allowing attempts to register the UE with a telecommunication network associated with the carrier at least in part by sending the carrier subscriber data retrieved or derived from a SIM of the UE.

15. The non-transitory computer-readable storage medium of claim 13, wherein the blockchain is a permissioned blockchain configured to be updated by a plurality of authorized entities including one or more of: the carrier, other carriers, or UE manufacturers.

16. The non-transitory computer-readable storage medium of claim 13, wherein the blockchain indicates that the UE is to be disabled when the UE has been reported as stolen to an authorized entity and the authorized entity updated the blockchain with a disabled status indicator indicating that the UE is to be disabled.

17. The non-transitory computer-readable storage medium of claim 13, wherein the operations further comprise:
sending a SIM unlock request to the carrier requesting that the carrier update the blockchain to indicate that the UE is not SIM locked;
determining, during a subsequent boot-up, that the blockchain indicates that the UE is not SIM locked in association with the carrier; and
responsive to determining that the blockchain indicates that the UE is not SIM locked in association with the carrier, allowing subsequent attempts to register the UE with the telecommunication networks that are not associated with the carrier.

* * * * *